US011462752B2

(12) United States Patent
Pettit et al.

(10) Patent No.: US 11,462,752 B2
(45) Date of Patent: Oct. 4, 2022

(54) MOBILE FUEL CELL DIRECT CURRENT FAST CHARGER AND PORTABLE POWER SUPPLY THERMAL INTEGRATION

(71) Applicant: GM Global Technology Operations LLC, Detroit, MI (US)

(72) Inventors: William H. Pettit, Rochester, NY (US); Charles E. Freese, V, Ira Township, MI (US); Margarita M. Mann, Royal Oak, MI (US); Alan B. Martin, Washington, MI (US); Matthew C. Kirklin, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 642 days.

(21) Appl. No.: 16/424,085

(22) Filed: May 28, 2019

(65) Prior Publication Data

US 2020/0381750 A1 Dec. 3, 2020

(51) Int. Cl.
*H01M 8/00* (2016.01)
*H01M 8/04007* (2016.01)
*H01M 10/66* (2014.01)
*H01M 8/04029* (2016.01)
*H01M 8/04701* (2016.01)
(Continued)

(52) U.S. Cl.
CPC ......... *H01M 8/04074* (2013.01); *B60L 53/57* (2019.02); *B60L 53/60* (2019.02); *B60L 58/33* (2019.02); *B60L 58/34* (2019.02); *H01M 8/04029* (2013.01); *H01M 8/04231* (2013.01); *H01M 8/04701* (2013.01); *H01M 10/46* (2013.01); *H01M 10/66* (2015.04); *H01M 2220/20* (2013.01)

(58) Field of Classification Search
CPC ....... H01M 8/04074; H01M 8/040029; H01M 10/46; H01M 10/66; H01M 16/006; B60L 53/57; B60L 53/60; B60L 58/33; B60L 58/34; Y02T 10/7072; Y02T 90/12
See application file for complete search history.

(56) References Cited

U.S. PATENT DOCUMENTS 8,034,500 B2 * 10/2011 Desrosiers .............. B60L 50/72
429/433
8,356,682 B2 * 1/2013 Grieve .............. H01M 8/04268
429/433
(Continued)

FOREIGN PATENT DOCUMENTS

DE 102011076737 A1 * 12/2012 ............... B60K 6/32
DE 102015015641 A1 * 8/2016
(Continued)

*Primary Examiner* — Naum Levin
(74) *Attorney, Agent, or Firm* — Quinn IP Law

(57) ABSTRACT

A system for managing heat in a mobile charger configured to provide power to an electric vehicle includes the mobile charger. The mobile charger includes a fuel cell stack, a heat reservoir, and a liquid coolant system including one or more liquid coolant loops configured to transfer heat between the fuel cell stack and the heat reservoir. The mobile charger further includes a computerized processor which is programmed to selectively control the liquid coolant system in one of a plurality of a thermal management modes configured to selectively remove heat from the fuel cell stack and provide heat to the fuel cell stack.

20 Claims, 14 Drawing Sheets

(51) Int. Cl.
*H01M 10/46* (2006.01)
*B60L 53/60* (2019.01)
*B60L 58/33* (2019.01)
*B60L 58/34* (2019.01)
*H01M 8/04223* (2016.01)
*B60L 53/57* (2019.01)

(56) References Cited

U.S. PATENT DOCUMENTS

| | | | | |
|---|---|---|---|---|
| 9,505,311 B2* | 11/2016 | Frank | | B60L 53/14 |
| 9,586,497 B2* | 3/2017 | Epstein | | B60L 53/11 |
| 9,592,742 B1* | 3/2017 | Sosinov | | B60L 53/14 |
| 10,340,709 B2* | 7/2019 | Dyer | | H01M 10/6567 |
| 10,373,238 B2* | 8/2019 | Hill | | G01C 21/3407 |
| 10,714,799 B2* | 7/2020 | Yamamura | | H01M 8/04358 |
| 11,065,936 B2* | 7/2021 | Gonze | | B60H 1/00899 |
| 2010/0273080 A1* | 10/2010 | Noguchi | | B60L 58/30 |
| | | | | 429/442 |
| 2012/0303397 A1* | 11/2012 | Prosser | | B60L 53/18 |
| | | | | 705/7.12 |
| 2014/0097797 A1* | 4/2014 | Hendrix | | H01M 10/637 |
| | | | | 320/118 |
| 2017/0346322 A1* | 11/2017 | Kuran | | H02J 7/0031 |
| 2017/0365901 A1* | 12/2017 | Hiramitsu | | H01M 8/04029 |
| 2018/0290559 A1* | 10/2018 | Oya | | H01M 8/0488 |
| 2019/0123406 A1* | 4/2019 | Yamamura | | H01M 10/66 |
| 2020/0161691 A1* | 5/2020 | Yoshitomi | | B60L 3/0053 |
| 2020/0391876 A1* | 12/2020 | Morrison | | B64C 27/08 |

FOREIGN PATENT DOCUMENTS

| | | | | | |
|---|---|---|---|---|---|
| EP | 1562019 | A1 * | 8/2005 | | B60K 1/00 |
| EP | 1203697 | B1 * | 6/2006 | | B60K 6/32 |
| EP | 3838654 | A1 * | 6/2021 | | B60L 50/50 |
| FR | 2995839 | A1 * | 3/2014 | | B60L 1/003 |
| JP | 6521232 | B2 * | 5/2019 | | |

* cited by examiner

FIG. 7A
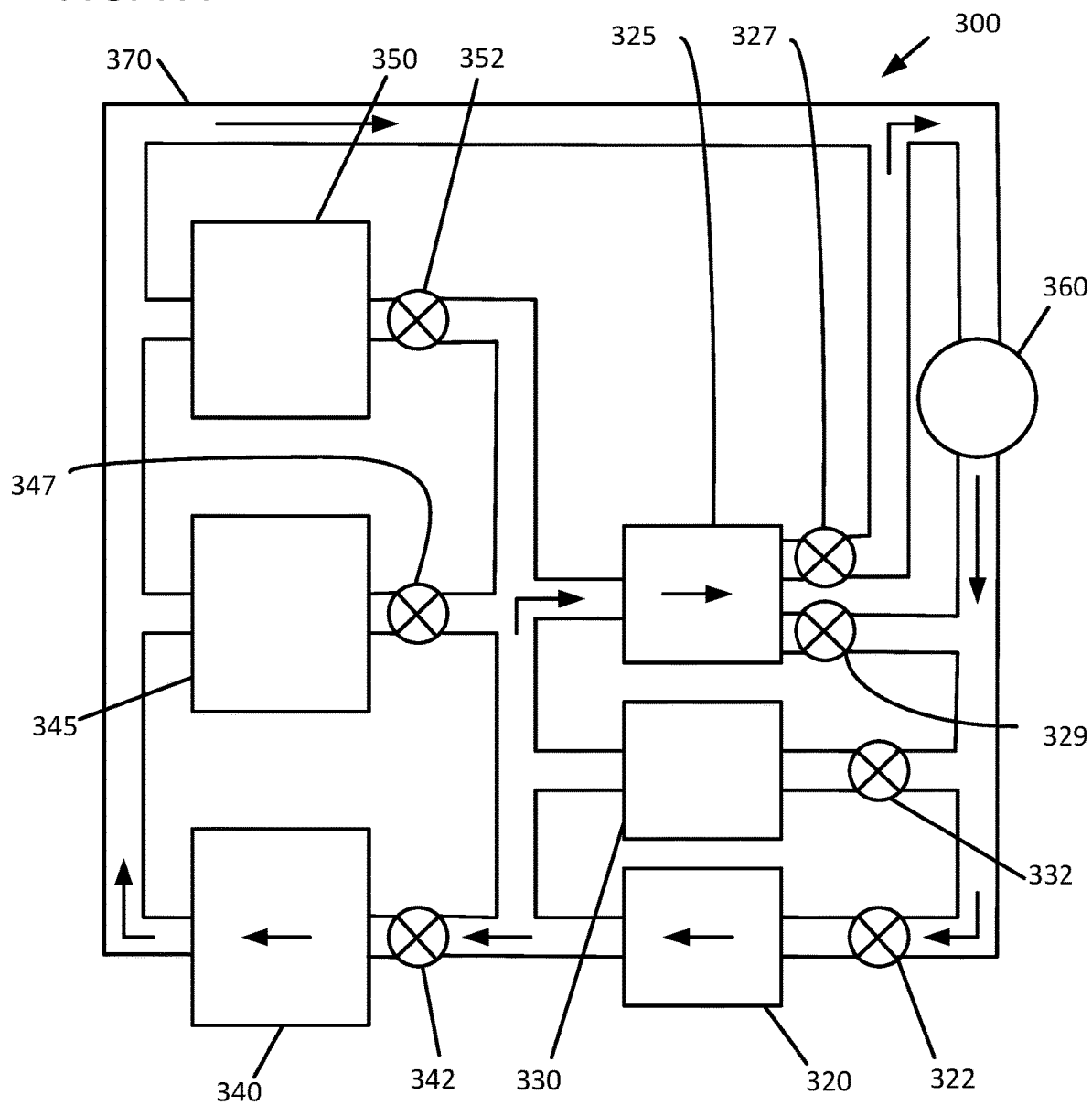
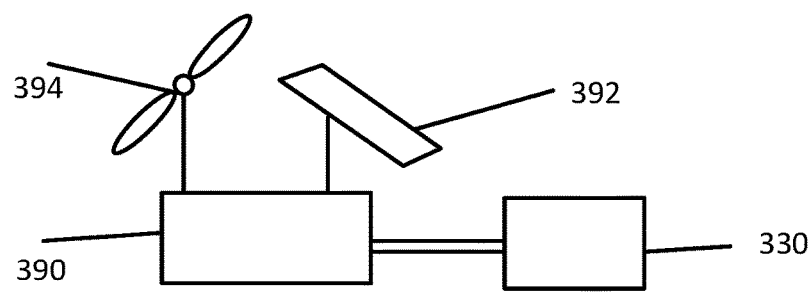
FIG. 7B

MOBILE FUEL CELL DIRECT CURRENT FAST CHARGER AND PORTABLE POWER SUPPLY THERMAL INTEGRATION

INTRODUCTION

The disclosure generally relates to a system and method for providing thermal management of a fuel cell stack.

Fuel cells are electrochemical devices which combine a fuel such as hydrogen and an oxidant such as oxygen to produce electricity. The term "fuel cell" is typically used to refer to either a single cell or a plurality of cells depending upon the context in which it is used. The plurality of cells is typically bundled together and arranged to form a stack with the plurality of cells commonly arranged in electrical series.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

Electric vehicles have a range defined by the limited energy storage capacity of the vehicle. If the vehicle is battery powered, the vehicle will move so long as the energy storage device(s) of the vehicle can provide a minimum power to the electric machine(s) used to propel the vehicle. Energy storage devices may be recharged regularly to permit the vehicle to refresh its maximum available range.

Energy storage devices and fuel cell stacks are each designed to work in a design temperature range. Operation of an energy storage device outside of its design temperature range results in reduced efficiency and undesirable energy output. Operation of a fuel cell stacks outside of their design temperature range results in reduced efficiency and increased fuel consumption.

Fuel cell stacks convert a fuel and an oxidizer into electrical energy useful to power a circuit, for example, for the purpose of recharging an automotive energy storage device. In addition, as part of that conversion, heat energy and water are produced as by-products of the conversion. Fuel cell stacks typically include one or more radiator devices. In one embodiment, a coolant liquid or a coolant is used in a coolant loop to pass through a heat exchanger located within or proximately to the fuel cell stack, wherein excess heat from the fuel cell stack is transferred from the stack through the heat exchanger to the coolant, and the coolant loop is used to circulate that heated coolant to the radiator, where the heat is expelled to an ambient environment. In this way, fuel cell stacks are prevented from operating above their design temperature range. Similarly, a heat exchanger and coolant loop can be used to prevent an energy storage device, for example, during a charging cycle, from overheating.

In some conditions, a fuel cell stack or an energy storage device can be too cold, either causing the device to operate inefficiently or potentially causing unintentional effects, such as water within the fuel cell stack freezing. Methods include expending fuel in the fuel cell stack periodically, based upon a temperature sensor, or predictively to generate heat useful to maintain the fuel cell stacks and/or energy storage devices within design temperature ranges.

Fuel cell systems are designed to allow running during freezing condition as well as being froze given special operational conditions are executed every shutdown or via temperature sensing wakeup software. Although these approaches may be utilized, they add additional cycles on a fuel cell membrane resulting in reduced mechanical durability of the membrane.

SUMMARY

A system for managing heat in a mobile charger configured to provide power to an electric vehicle is provided herein and includes the mobile charger. The mobile charger includes a fuel cell stack, a heat reservoir, and a liquid coolant system including one or more liquid coolant loops configured to transfer heat between the fuel cell stack and the heat reservoir. The mobile charger further includes a computerized processor which is programmed to selectively control the liquid coolant system in one of a plurality of thermal management modes configured to selectively remove heat from the fuel cell stack and provide heat to the fuel cell stack. The system may be used as part of a fuel cell system, a battery, or power conversion electronics.

In one or more embodiments, the computerized processor programmed to selectively control the liquid coolant system in one of the plurality of thermal management modes includes the computerized processor programmed to selectively control the liquid coolant system in one of a heat capture mode configured to provide heat to the heat reservoir from the fuel cell stack, and a heat providing mode configured to provide heat from the heat reservoir to the fuel cell stack.

In one or more embodiments, the computerized processor programmed to control the liquid coolant system in the heat providing mode includes the computerized processor programmed to control the liquid coolant system in one of an antifreeze mode configured to prevent the fuel cell stack from reaching a freezing condition, and a pre-warm mode configured to bring the fuel cell stack to a minimum temperature of a design temperature range for the fuel cell stack.

In one or more embodiments, wherein the mobile charger further includes a radiator device configured to expel heat.

In one or more embodiments, wherein the computerized processor programmed to control the liquid coolant system in the heat providing mode includes the computerized processor programmed to control the liquid coolant system in one of a heat expelling mode wherein heat is expelled through the radiator device, and a maximum heat expelling mode wherein heat is expelled through the radiator device and heat is provided from the fuel cell stack to the heat reservoir.

In one or more embodiments, the mobile charger further includes an energy storage device, and the liquid coolant system is configured to transfer heat between the fuel cell stack, the energy storage device, and the heat reservoir. In one or more embodiments, wherein the energy storage device includes a renewable energy storage device.

In one or more embodiments, the fuel cell stack includes a first fuel cell stack, the mobile charger further includes a second fuel cell stack, the liquid coolant system is configured to transfer heat between the first fuel cell stack, the second fuel cell stack, and the heat reservoir, and the computerized processor programmed to selectively control the liquid coolant system in one of a plurality of thermal management modes includes the computerized processor programmed to selectively control the liquid coolant system in one of a heat capture mode configured to provide heat to the heat reservoir from the first fuel cell stack and the second fuel cell stack, a heat providing mode configured to provide heat from the heat reservoir to the first fuel cell stack and the second fuel cell stack, and a heat transference mode configured to provide heat from the first fuel cell stack to the second fuel cell stack.

In one or more embodiments, the mobile charger further includes a fuel cell housing containing the fuel cell stack, and a fuel cell ventilation fan configured to purge fuel cell housing of trace hydrogen gas.

In one or more embodiments, the system further includes a thermal insulator attached to the fuel cell stack.

In one or more embodiments, the system further includes a thermal insulator attached to the heat reservoir.

In one or more embodiments, the mobile charger further includes a first radiator device and a second radiator device, and the liquid coolant system is configured to transfer heat between the fuel cell stack, the first radiator device, the second radiator device, and the heat reservoir.

In one or more embodiments, the computerized processor programmed to selectively control the liquid coolant system in one of the plurality of thermal management modes includes the computerized processor programmed to selectively control the liquid coolant system to expel heat from the first radiator device and the second radiator device, provide heat from the fuel cell stack to the heat reservoir, expel heat from the first radiator device and provide heat to the heat reservoir, and provide heat to the fuel cell stack from the heat reservoir.

A system for managing heat in a mobile charger configured to provide power to an electric vehicle is provided and includes the mobile charger including a first fuel cell stack, a second fuel cell stack, an energy storage device, a heat reservoir, a radiator device, a liquid coolant system including one or more liquid coolant loops configured to transfer heat between the first fuel cell stack, the second fuel cell stack, the energy storage device, the heat reservoir, and the radiator device, and a computerized processor, programmed to selectively control the liquid coolant system in one of a plurality of thermal management modes configured to selectively transfer heat between the first fuel cell stack, the second fuel cell stack, the energy storage device, and the heat reservoir.

In one or more embodiments, the computerized processor programmed to selectively control the liquid coolant system in one of a plurality of thermal management modes includes the computerized processor programmed to selectively control the liquid coolant system in one of a heat capture mode configured to provide heat to the heat reservoir from one of the first fuel cell stack, the second fuel cell stack, and the energy storage device, a heat providing mode configured to provide heat from the heat reservoir to one of the first fuel cell stack, the second fuel cell stack, and the energy storage device, a heat expelling mode configured to expel heat from the radiator device, a maximum heat expelling mode configured to expel heat from the radiator device and to provide heat to the heat reservoir from one of the first fuel cell stack, the second fuel cell stack, and the energy storage device, a first heat transference mode configured to provide heat from the first fuel cell stack to the second fuel cell stack, a second heat transference mode configured to provide heat from the first fuel cell stack to the energy storage device, and a third heat transference mode configured to provide heat from the energy storage device to first fuel cell stack.

A method for managing heat in a mobile charger configured to provide power to an electric vehicle is provided and includes selectively transferring heat from a fuel cell stack of the mobile charger to a heat reservoir of the mobile charger through a liquid coolant system configured to provide thermal management of the fuel cell stack of the mobile charger and the heat reservoir of the mobile charger and selectively transferring heat to the fuel cell stack of the mobile charger from the heat reservoir of the mobile charger through the liquid coolant system.

In one or more embodiments, the method further includes selectively transferring heat from the fuel cell stack of the mobile charger to a radiator device of the mobile charger through the liquid coolant system.

In one or more embodiments, the method further includes selectively simultaneously transferring heat from the fuel cell stack of the mobile charger to the radiator device of the mobile charger through the liquid coolant system and transferring heat from the fuel cell stack of the mobile charger to the heat reservoir of the mobile charger through the liquid coolant system.

In one or more embodiments, the method further includes selectively transferring heat from a plurality of fuel cell stacks of the mobile charger to the heat reservoir of the mobile charger through the liquid coolant system, and selectively transferring heat to the plurality of fuel cell stacks of the mobile charger from the heat reservoir of the mobile charger through the liquid coolant system.

In one or more embodiments, the method further includes utilizing a fuel cell ventilating fan to purge trace hydrogen gas from a fuel cell housing containing the fuel cell stack.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 7A illustrates an alternative exemplary fuel cell stack thermal management system including a first fuel cell stack, a second fuel cell stack, an energy storage device, a coolant loop configured to maintain temperature within the fuel cell stack and the energy storage device, and a heat reservoir configured to selectively store heat, in accordance with the present disclosure;

FIG. 7B illustrates an exemplary renewable energy source unit capable of providing power to an renewable energy storage device, in accordance with the present disclosure;

DETAILED DESCRIPTION

A system and method for managing heat related to a fuel cell stack includes a heat reservoir useful to selectively store heat and selectively provide heat to other parts of the system. Maintaining design temperature ranges for different portions of a system including a fuel cell stack can be important. Utilizing thermal storage within a heat reservoir can provide efficient and effective thermal management of the fuel cell stack and other system components.

Figure 1:
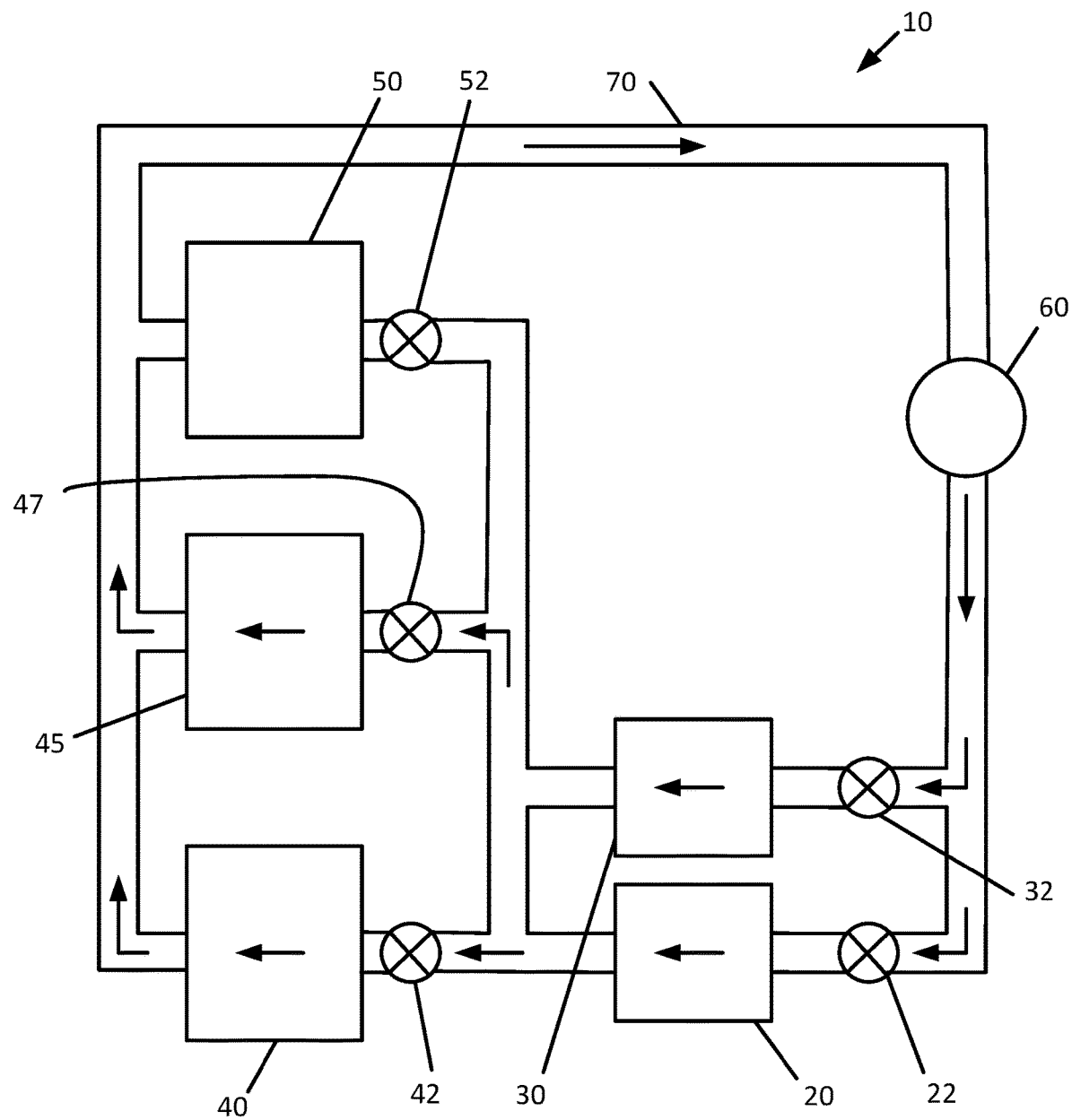
FIG. 1 illustrates an exemplary fuel cell stack thermal management system including a fuel cell stack, an energy storage device, a coolant loop configured to maintain temperature within the fuel cell stack and the energy storage device, and a heat reservoir configured to selectively store heat, wherein the system is in a heat expelling mode, in accordance with the present disclosure.

FIG. 1 illustrates an exemplary fuel cell stack thermal management system including a fuel cell stack, an energy storage device, a coolant loop configured to maintain temperature within the fuel cell stack and the energy storage device, and a heat reservoir configured to selectively store heat, wherein the system is in a heat expelling mode. Fuel cell stack thermal management system 10 is illustrated, including fuel cell stack 20, energy storage device 30, first radiator device 40, second radiator device 45, water pump 60, and heat reservoir 50. Various pipes or coolant hoses are illustrated as coolant loop 70 configured to route coolant to and away from the various components of fuel cell stack thermal management system 10. Water pump 60 can be described as a pump in the art capable of providing a coolant flow around coolant loop 70 in a direction. In one embodiment, water pump 60 can be reversible, such that a polarity of power provided to the pump can reverse a direction that the coolant flows around coolant loop 70.

Fuel cell stack 20 is a device in the art for converting a fuel and an oxidizer into energy. Fuel cell stack 20 generates heat as a by-product when the fuel cell stack is in an on state or active state. The heat generated by fuel cell stack 20, if not managed, would cause the fuel cell stack to have a temperature over a design temperature range for the fuel cell stack. As a result, coolant loop 70 is configured to remove heat from fuel cell stack 20 to manage the temperature of fuel cell stack 20 and prevent fuel cell stack from exceeding design temperatures. Energy storage device 30 similarly can generate heat and requires thermal management to prevent the temperature of energy storage device 30 from exceeding design temperatures. Fuel cell stack 20 may be connected to energy storage device 30 and may be controlled by a dedicated computerized control module configured to enable fuel cell stack 20, energy storage device 30, and other connected components to supply power to another external device, such as an energy storage device of an electric vehicle that is to be recharged.

Radiator device 40 and radiator device 45 are illustrated, each providing a heat exchanger equipped to receive a heated flow of coolant from fuel cell stack 20 and/or energy storage device 30 and expel heat from the system. One radiator device or more than two radiator devices can be used in a thermal management system. In one embodiment, one or both of radiator devices 40 and 45 can include fans operable to force air through the respective radiator device and increase a rate at which heat is expelled from the radiator device.

Valves are illustrated configured to control flow of coolant through the various components of fuel cell stack thermal management system 10. A number of valve configuration can be utilized, for example, including an electronic solenoid or vacuum pressure activated valve. Valve 22 is illustrated controlling coolant flow through fuel cell stack 20. Valve 32 is illustrated controlling coolant flow through energy storage device 30. Valve 42 is illustrated controlling coolant flow through radiator 40. Valve 47 is illustrated controlling coolant flow through radiator 45. Valve 52 is illustrated controlling coolant flow through heat reservoir 50.

Fuel cell stack thermal management system 10 is capable of being operated in various states and modes, based upon an open state and closed state of the various valves and a direction of flow created by water pump 60. FIG. 1 illustrates fuel cell stack thermal management system 10 in a heat expelling mode. In the exemplary embodiment of FIG. 1, both valve 22 and valve 32 are illustrated in open states, such that coolant flow is channeled through both fuel cell stack 20 and energy storage device 30, consistent with operation of fuel cell stack 20 and energy storage device 30 in conditions where both are generating heat. Valves 42 and 47 are both in open states, so coolant flow is channeled through both radiator device 40 and radiator device 45, both expelling heat from the system. In the heat expelling mode of FIG. 1, no heat is added to heat reservoir 50, and all heat being generated is being expelled to ambient air.

For purposes of illustration, coolant is shown with arrows flowing one direction in the figures when heat is being drawn out of fuel cell stack 20 and energy storage device 30 and in the opposite direction when heat is being added to fuel cell stack 20 and energy storage device 30. It will be appreciated that the flows can but need not actually change flow direction based upon whether heat is being drawn out of or is being added to a device. The heat exchange functions described herein will work regardless of a direction of fluid flow.

Components within the system or systems described herein can include temperature sensors or thermocouples in the art for the purpose of providing feedback control, other control, or temperature predictive capabilities in support of the system functionality described herein.

FIG. 1 illustrates one potential embodiment of the thermal architecture loop with the purpose being to providing cooling loops which can either cool the battery and/or fuel cell via radiator(s) and/or thermal reservoir or heat the battery and fuel cell. Heat from the reservoir can be used to heat the battery and/or fuel cell dependent on state of either. Waste heat from the fuel cell can be used to heat the battery. There are many possible thermal architectures which could be used dependent on specific fuel cell and battery technology. The example in figure one would assume a technology where the coolant in temperatures to the fuel cell and battery are the same. An exemplary system includes a potential thermal architecture where the coolant loops are separated to maintain the optimal temperatures of each loop.

Figure 14:
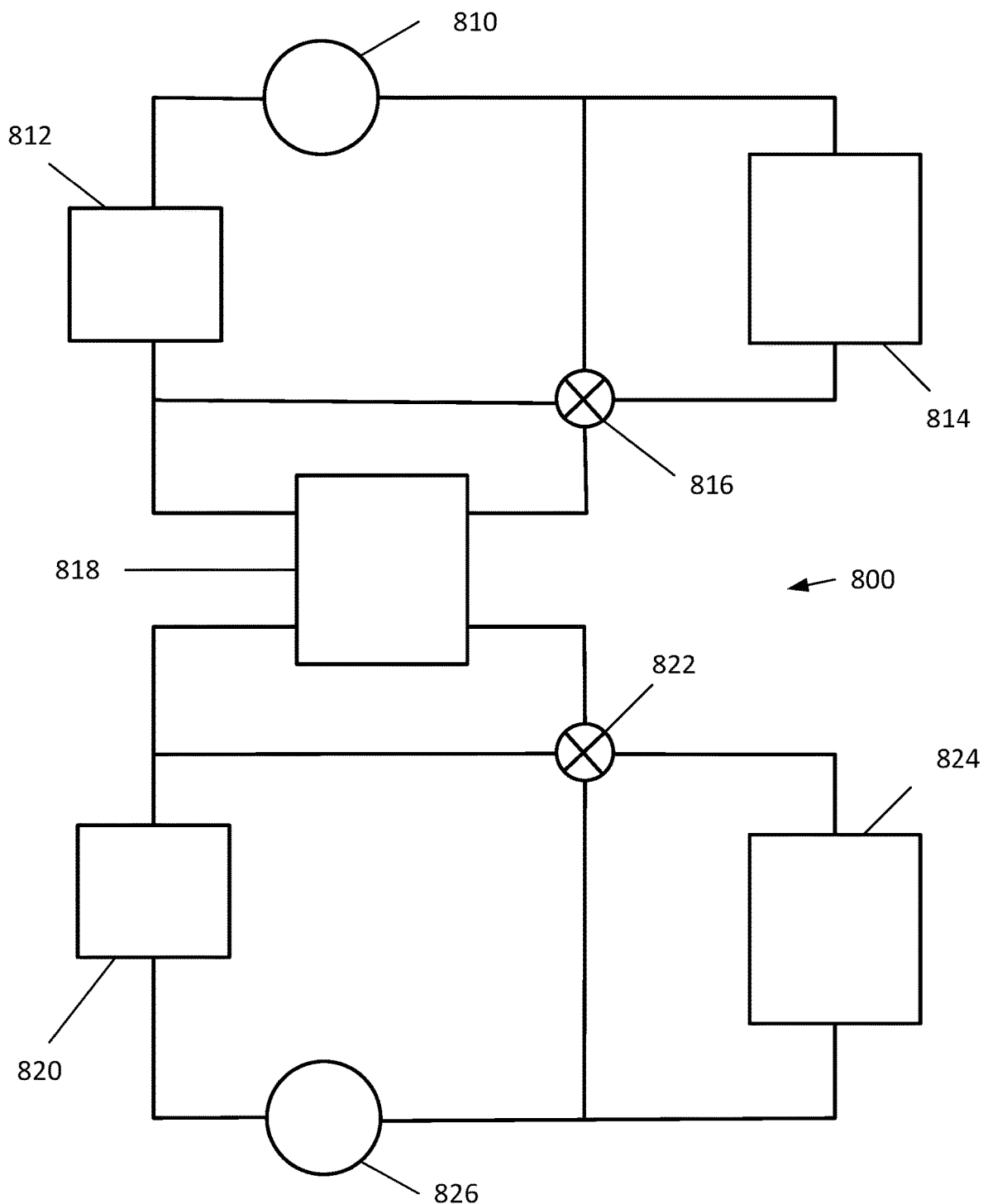
FIGS. 14 and 15 schematically illustrate alternative exemplary fuel cell stack thermal management systems, in accordance with the present disclosure.
Figure 15:
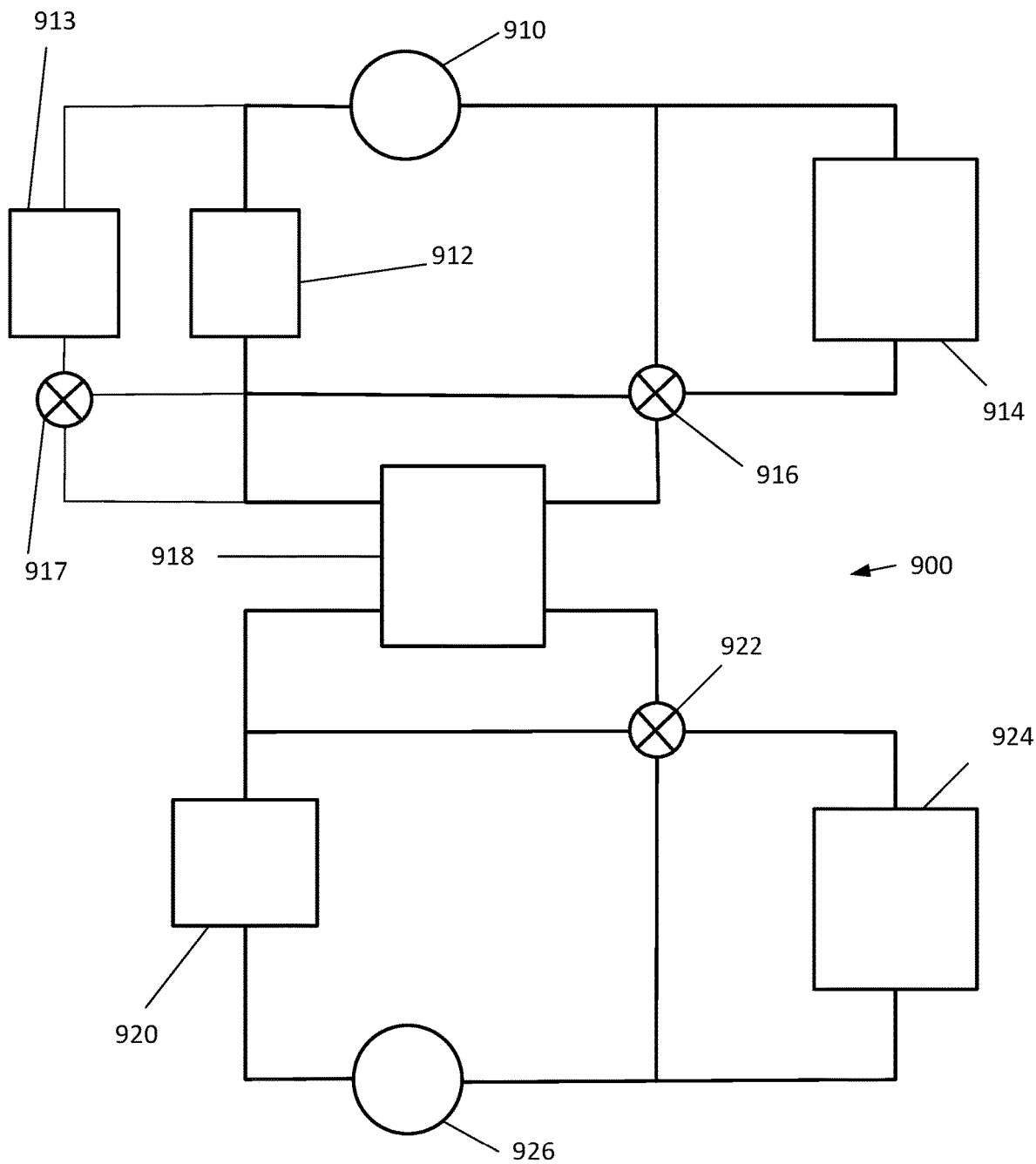

FIGS. 14 and 15 schematically illustrate alternative exemplary fuel cell stack thermal management systems. FIG. 14 illustrates an exemplary embodiment including a single heat reservoir serving a system including a first coolant loop serving a fuel cell and a second coolant loop serving an energy storage device. System 800 includes first water pump 810, fuel cell 812, first radiator 814, valve 816, heat reservoir 818, energy storage device 820, valve 822, second radiator 824, and second water pump 826. Heat reservoir 818 maintains the coolant flows of the two loops separately from each other but may optionally permit heat transfer between the two flows.

FIG. 15 illustrates an exemplary embodiment including a single thermal reservoir serving a system including a first coolant loop serving a fuel cell and a second coolant loop serving an energy storage device. System 900 includes first water pump 910, first fuel cell 912, second fuel cell 913, first radiator 914, valve 916, valve 917, heat reservoir 918, energy storage device 920, valve 922, second radiator 924, and second water pump 926. Heat reservoir 918 maintains the coolant flows of the two loops separately from each other but may optionally permit heat transfer between the two flows. According to the embodiments of the disclosure, some energy storage devices and fuel cells require separate coolant loops due to different required coolant temperatures. Throughout the disclosure, a liquid coolant system configured to transfer heat between one or more fuel cell stacks and an energy storage device may include a single coolant loop or a plurality of coolant loops, or a liquid coolant system can include one or more liquid coolant loops.

Valve configurations in the various drawings are exemplary and can change based upon designed functionality of the system. In one exemplary embodiment, a fuel cell can have neighboring valves that, during a warm up condition with the fuel cell recently activated, the fuel cell and the water pump can be in a circuit with the coolant recycling through the fuel cell to get the coolant as warm as possible in a short time. Check valves can be used in some embodiments. The valve illustrations and descriptions are illustrative examples and are not intended to be limiting.

Figure 2:
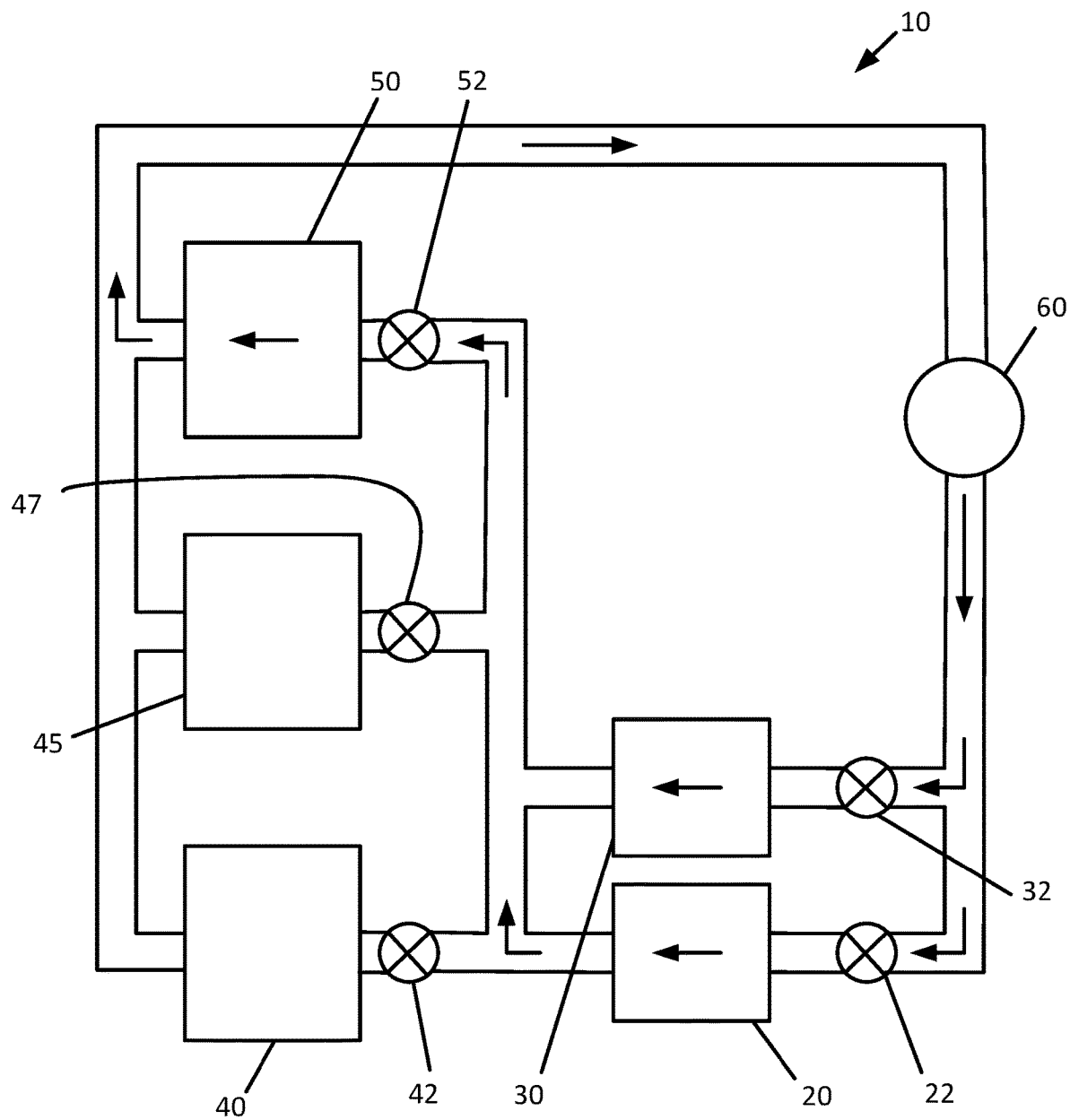
FIG. 2 illustrates the fuel cell stack thermal management system of FIG. 1, wherein the system is in a heat capture mode, in accordance with the present disclosure.

FIG. 2 illustrates the fuel cell stack thermal management system of FIG. 1, wherein the system is in a heat capture mode. Fuel cell stack thermal management system 10 is illustrated including fuel cell stack 20, energy storage device 30, water pump 60, and heat reservoir 50. Valve 22, valve 32 and valve 52 are illustrated in open states, while valve 42 and 47 are illustrated in closed states. As a result, a heated coolant flow exiting one or both of fuel cell stack 20 and energy storage device 30 bypass radiator device 40 and radiator device 45, with the heated coolant flow flowing through heat reservoir 50.

Heat reservoir 50 can include features or details useful to store heat energy within the reservoir. Heat reservoir 50 can include an internal volume useful to store heated coolant within the internal volume for the purposes of later moving that heating coolant to another part of the system for the purpose of providing heat to that part. Heated reservoir 50 can include thermal insulation to slow a cooling rate of heated coolant stored there within. In alternative uses, heated reservoir 50 can store unheated or low temperature coolant for the purposes of later moving that low temperature coolant to another part of the system for the purpose of removing heat from that part. Heated reservoir 50 can include a heat transfer medium within the reservoir, for example, including a material configured to undergo a phase change (example, from liquid to gas) to increase a heat storage capacity of heated reservoir 50.

In the configuration illustrated in FIG. 2, with the system in a thermal capture mode, heat can be generated in fuel cell stack 20 and/or energy storage device 30 and stored within heat reservoir 50 for later use elsewhere in the system. Flow through either fuel cell stack 20 or energy storage device 30 can be controlled by opening or closing valve 22 or valve 32, respectively.

Figure 3:
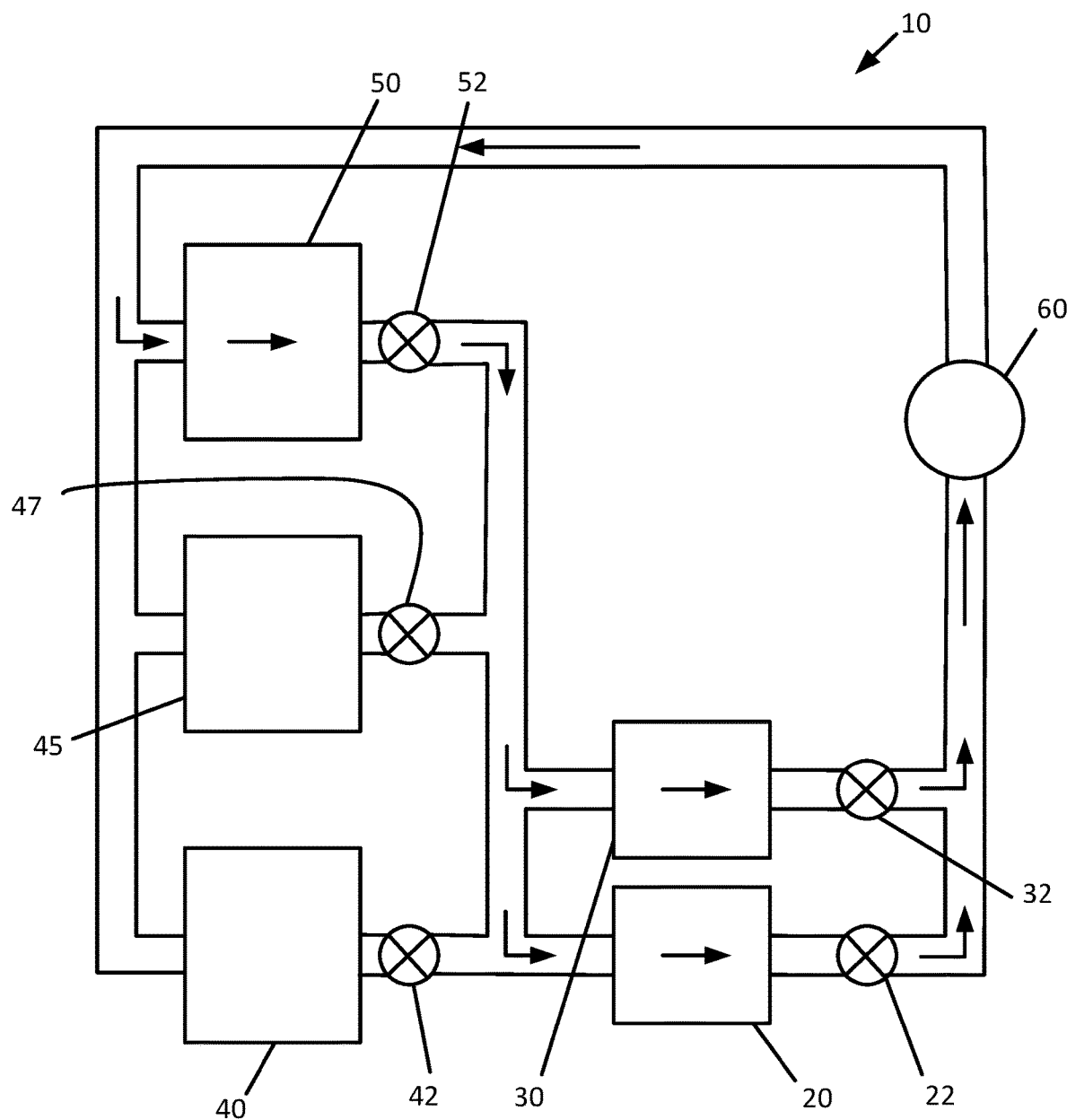
FIG. 3 illustrates the fuel cell stack thermal management system of FIG. 1, wherein the system is in a heat providing mode, in accordance with the present disclosure.

Thermal management modes can be operated in modes configured to provide heat to one of the devices or components of the fuel cell stack thermal management system. A plurality of such modes can be defined generally as a heat providing mode or modes. One example of a heat providing mode is an antifreeze mode, wherein heat is provided to a device to keep the device from reaching a freezing condition. Another example of a heat providing mode is a pre-warm mode, wherein heat is provided to a device to bring the device to a minimum temperature of a design temperature range for the device, enabling the device to start and operate efficiently. FIG. 3 illustrates the fuel cell stack thermal management system of FIG. 1, wherein the system is in an heat providing mode. Fuel cell stack thermal management system 10 is illustrated including fuel cell stack 20, energy storage device 30, water pump 60, and heat reservoir 50. Valve 22, valve 32 and valve 52 are illustrated in open states, while valve 42 and valve 47 are illustrated in closed states. As a result, a heated coolant flow is generated from stored heat within heat reservoir 50, and the heated coolant flow can be channeled through fuel cell stack 20 and/or energy storage device 30. Flow through either fuel cell stack 20 or energy storage device 30 can be controlled by opening or closing valve 22 or valve 32, respectively. Exemplary flow within fuel cell stack thermal management system 10 is illustrated reversed from a flow direction illustrated in FIG. 1, representing utilizing a shortest flow path from heat reservoir 50 to fuel cell stack 20 and energy storage device 30 possible, in an exemplary effort to reduce heat loss from the heated coolant in exemplary hoses between heat reservoir 50 and the devices to be heated. Based upon temperature set points in control programming of the fuel cell stack thermal management system, the illustrated heat providing mode could be specifically operated as either an antifreeze mode or a pre-warm mode.

Figure 4:
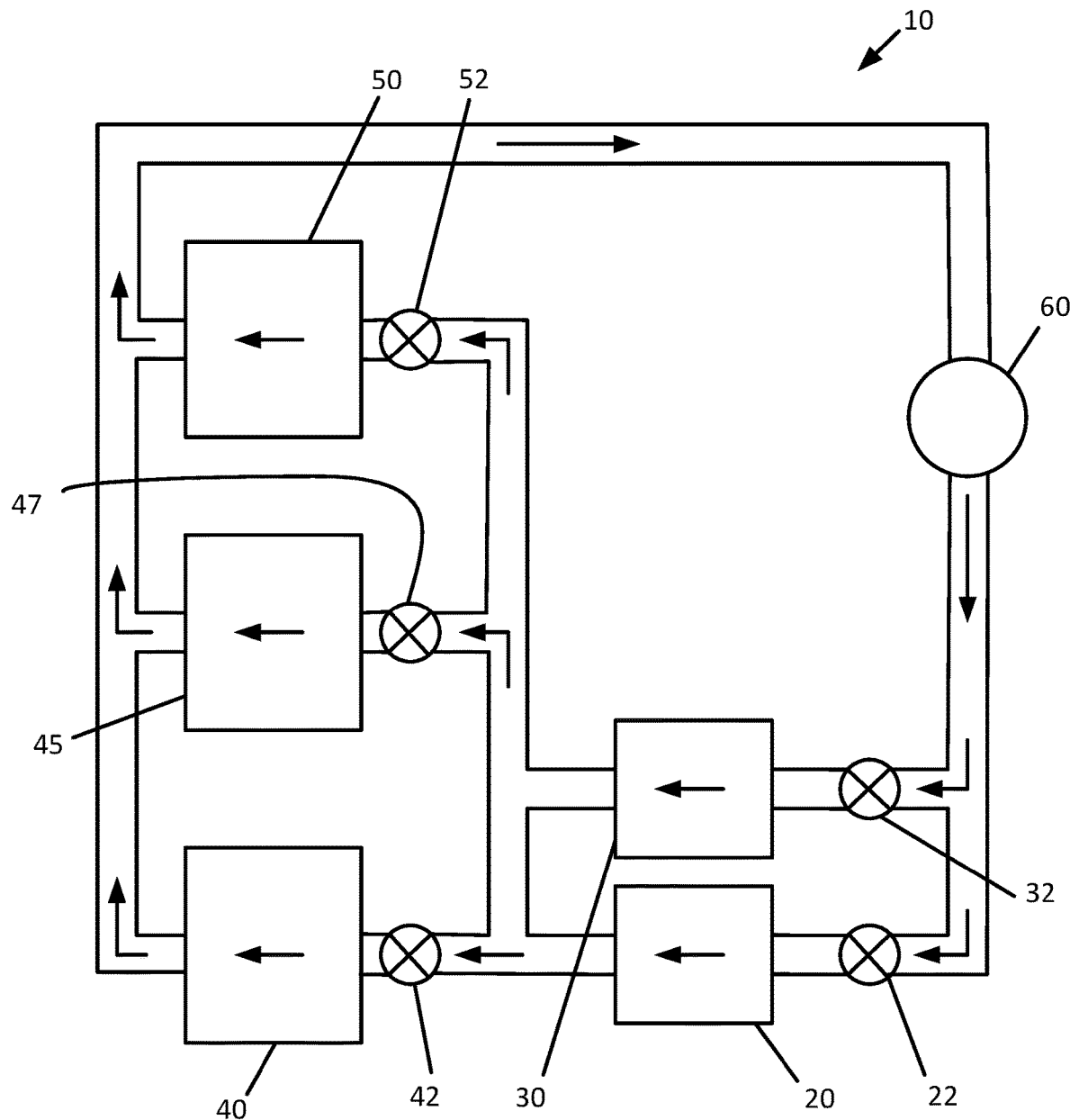
FIG. 4 illustrates the fuel cell stack thermal management system of FIG. 1, wherein the system is in a maximum heat expelling mode, in accordance with the present disclosure.

FIG. 4 illustrates the fuel cell stack thermal management system of FIG. 1, wherein the system is in a maximum heat expelling mode. Fuel cell stack thermal management system 10 is illustrated, including fuel cell stack 20, energy storage device 30, first radiator device 40, second radiator device 45, water pump 60, and heat reservoir 50. Valve 22, valve 32, valve 42, valve 47, and valve 52 are illustrated in open states. As a result, coolant is flowing through fuel cell stack 20 and energy storage device 30, removing heat from both devices, coolant is flowing through radiator devices 40 and 45, expelling heat through both devices, and coolant is flowing through heat reservoir 50. In one embodiment, in preparation for running a maximum heat expelling mode, heat reservoir 50 can initially be maintained in an unheated or low temperature state, such that when the maximum heat expelling mode is activated, heated coolant passing through heat reservoir 50 can provide heat to heat reservoir 50, bringing heat reservoir 50 to a heated or high temperature state, and thereby increasing a capacity of fuel cell stack thermal management system 10 to remove heat from fuel cell stack 20 and/or energy storage device 30 for a time. Once heat reservoir 50 is in the heated or high temperature state, valve 52 can be closed, and fuel cell stack thermal management system 10 can revert to the heat expelling mode illustrated in FIG. 1.

Figure 5:
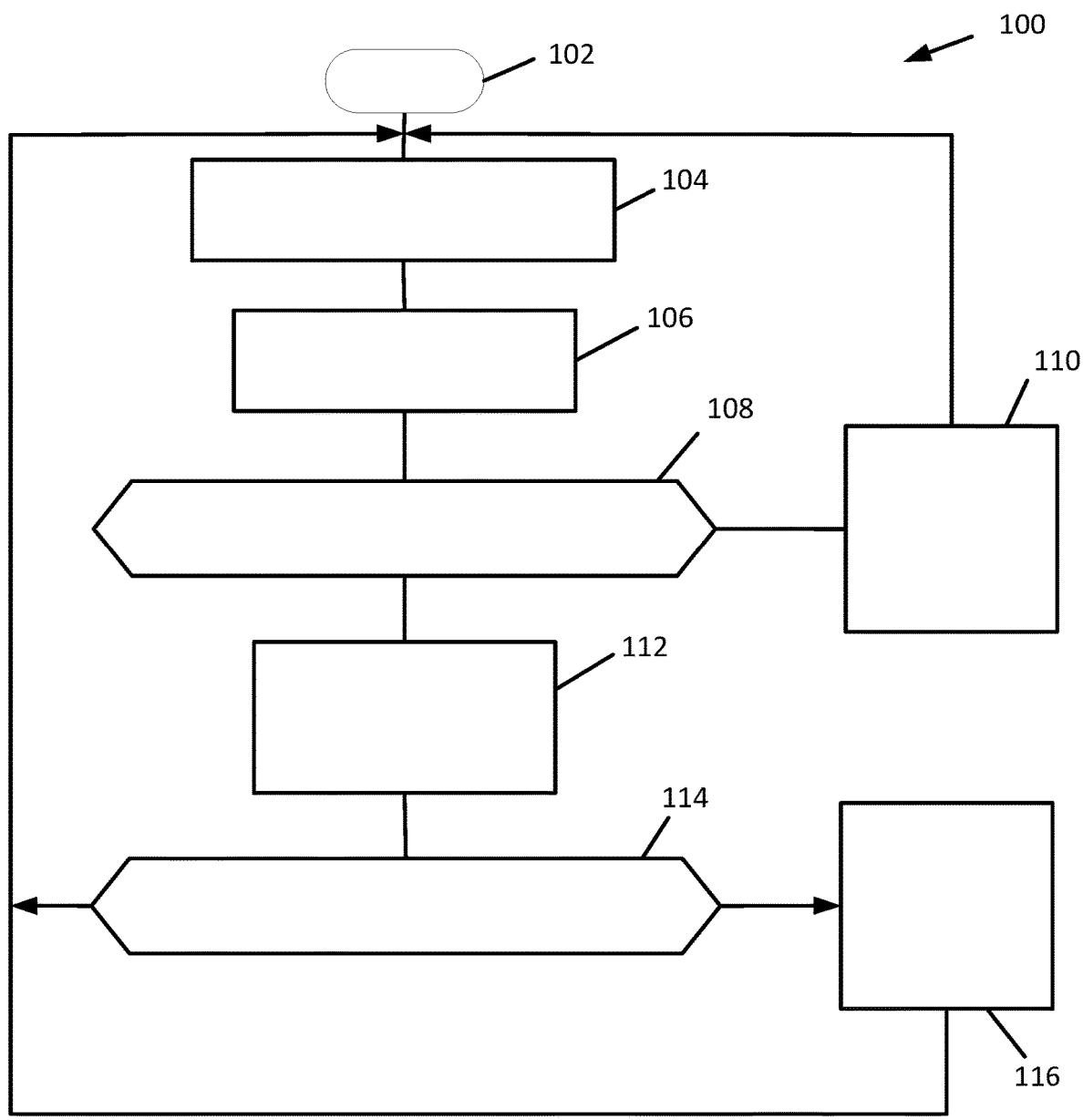
FIG. 5 is a flow chart illustrating an exemplary process for managing a state of a heat reservoir in anticipation of either operating an antifreeze mode or a maximum heat expelling mode, in accordance with the present disclosure.

FIG. 5 is a flow chart illustrating an exemplary process for managing a state of a heat reservoir in anticipation of either operating an antifreeze mode or a maximum heat expelling mode. Process 100 starts at step 102. At step 104, the system determines current ambient conditions, including, for example, a mode of operation for the fuel cell stack (for example, on/off/a current duty cycle/an expected duty cycle), a mode of operation for the energy storage device (for example, on/off/a current duty cycle/an expected duty cycle, recharge event), an ambient temperature, a time of day, and a sun load factor. At step 106, the system predicts expected ambient conditions for some projected period of time, for example, including an expected mode of the fuel cell stack (for example, scheduled on time/scheduled off time/an expected duty cycle), an expected mode of the energy storage device (for example, scheduled on time/scheduled off time/an expected duty cycle, an expected recharge event), forecast temperatures, associated times of day for the projected period of time, and expected sun load factors. At step 108, the system determines whether ambient conditions expected to create a high temperature condition for a component of the fuel cell stack thermal management system. If the system determines that no component is expected to experience a high temperature condition, the system advances to step 110, whereat the system maintains the heat reservoir in a heated state in readiness to operate an antifreeze mode, and the process subsequently returns to step 104. If the system determines that one or more component is expected to experience a high temperature condition, the process advances to step 112. At step 112, the system maintains the heat reservoir in an unheated state in readiness to operate a maximum heat expelling mode. At step 114, the system determines whether a system component requires additional cooling and capacity within the heat reservoir exist to accept heat from the system. If a system component does require additional cooling and it is determined that the heat reservoir does have capacity to accept heat from the system, at step 116, the system operates a maximum heat expelling mode, and subsequently returns to step 104. If no system component requires additional heating or if it is determined that the heat reservoir does not have capacity to accept heat from the system, the process returns to step 104. Process 100 as illustrated is exemplary, a number of alternative embodiments of process 100 are envisioned, and the disclosure is not intended to be limited to the examples provided herein.

Figure 6:
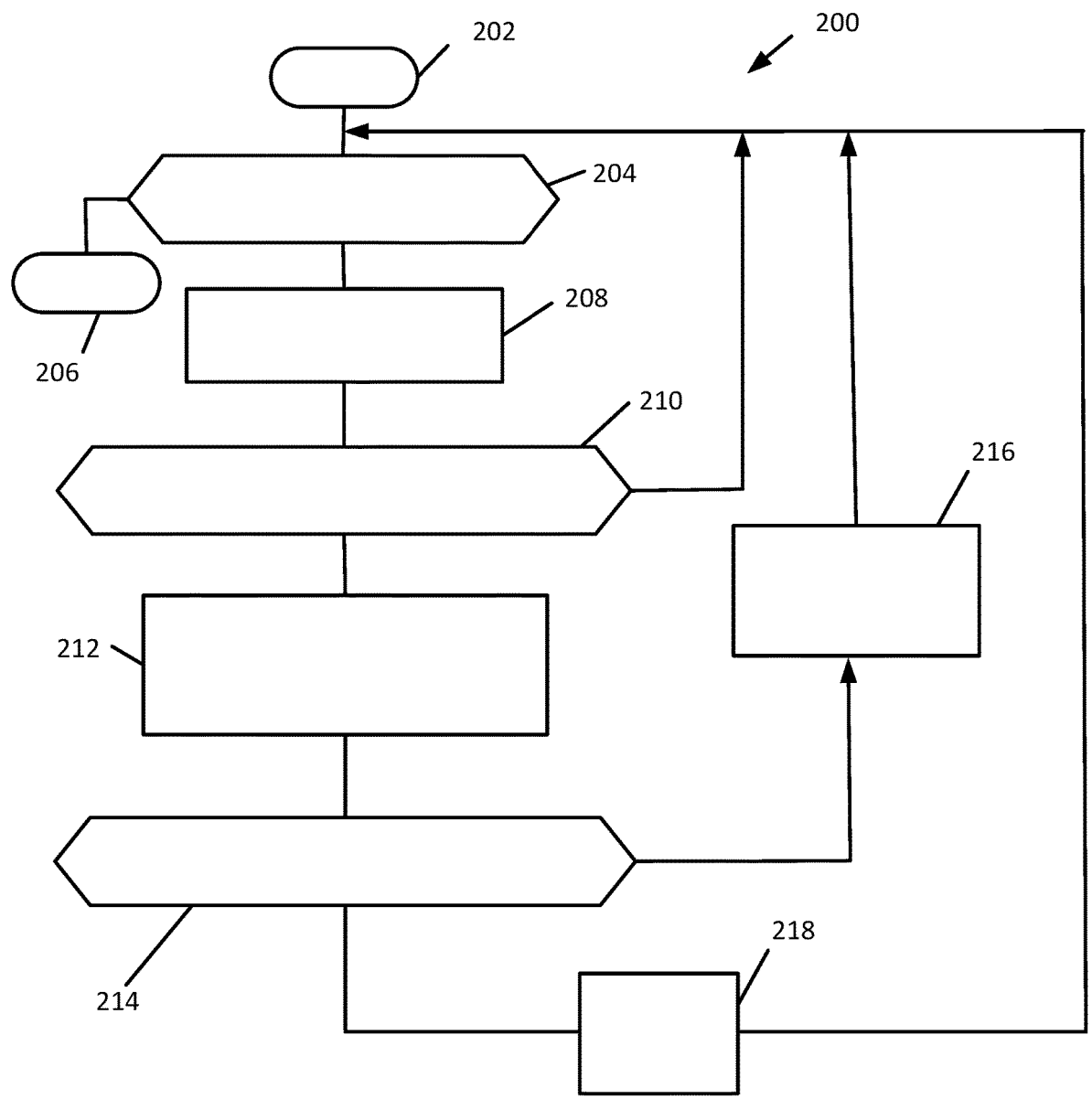
FIG. 6 is a flowchart illustrating an exemplary process to utilize the fuel cell stack thermal management system to provide heat to one or more system devices in either an antifreeze mode or a pre-warm mode, in accordance with the present disclosure.

FIG. 6 is a flowchart illustrating an exemplary process to utilize the fuel cell stack thermal management system to provide heat to one or more system devices in either an antifreeze mode or a pre-warm mode. Process 200 starts at step 202. At step 204, the system determines whether the mobile charger is in an off state. If the mobile charger is not in an off state, the process advances to step 206 where the process ends. If the mobile charger is in an off state, the process advances to step 208, wherein the system predicts expected ambient conditions (for example, forecast temperatures, associated times of day for the projected period of time, and expected sun load factors.) At step 210, the system determines whether ambient conditions are expected to create a low temperature condition for a component of the fuel cell stack thermal management system. If no component is expected to experience a low temperature condition, the process returns to step 204. If one or more components is expected to experience a low temperature condition, the process advances to step 212, where the system calculates the thermal needs of the various components of the fuel cell stack thermal management system. In one exemplary embodiment, components of the fuel cell stack thermal management system could include a fuel cell stack and a renewable energy storage system, for example, configured to receive thermal or electric energy from a solar energy collecting device. At step 214, the system determines whether both the exemplary fuel cell stack and exemplary renewable energy storage device are expected to require heat to stay above minimum design temperatures. If both exemplary devices are expected to require heat to stay above minimum design temperatures, the process advances to step 216, where the system balances supplying heat to the fuel cell stack in preparation for the fuel cell stack to turn on or maintain temperatures above freezing and supplying heat to the renewable energy storage system to have a required energy availability at a projected on temperature. After step 216, the process returns to step 204. A single one of the exemplary devices is expected to require heat to stay above its minimum design temperature, then the system advances to step 218 whereat heat is provided when required to the device that requires the heat. After step 218, the process returns to step 204. Process 200 is exemplary, a number of alternative embodiments of process 200 are envisioned, and the disclosure is not intended to be limited to the examples provided herein.

Process 200 can be used to maintain a device or devices above a threshold freezing temperature in an antifreeze mode. Process 200 additionally or alternatively, in a pre-warm mode, can be used to maintain a device or devices or prepare a device or devices to change from an off mode to an on mode by bringing the device or devices to a minimum on mode temperature.

FIG. 7A illustrates an alternative exemplary fuel cell stack thermal management system including a first fuel cell stack, a second fuel cell stack, an energy storage device, a coolant loop configured to maintain temperature within the fuel cell stack and the energy storage device, and a heat reservoir configured to selectively store heat. Fuel cell stack thermal management system 300 is illustrated, including first fuel cell stack 320, second fuel cell stack 325, energy storage device 330, first radiator device 340, second radiator device 345, water pump 360, and heat reservoir 350. Various pipes or coolant hoses are illustrated as coolant loop 370 configured to route coolant to and away from the various components of fuel cell stack thermal management system 300. Fuel cell stack thermal management system 300 is illustrated in a heat transference mode, wherein heat is being supplied from one fuel cell stack to a second fuel cell stack in preparation for the second fuel cell stack transitioning from an off state to an on state.

Second fuel cell stack 325 is illustrated with two valves controlling coolant flow to and from second fuel cell stack 325. Valve 329 permits second fuel cell stack 325 to selectively receive a coolant flow from water pump 360 in parallel to a coolant flow received by first fuel cell stack 320. With valve 329 open and valve 327 shut and with valve 322 open, first fuel cell stack 320 and second fuel cell stack 325 each receive similar coolant flows, either to remove heat from the fuel cell stacks or to supply heat to the fuel cell stacks. Alternatively with valve 327 open and with valve 329 closed and with valve 322 open, coolant flow from first fuel cell stack 320 flows subsequently through second fuel cell stack 325, thereby enabling heat removed from first fuel cell stack 320 to be supplied to second fuel cell stack 325.

In the embodiment of FIG. 7A, wherein the system is illustrated in a heat transference mode, valve 322, valve 327, and valve 342 are open, and valve 332, valve 329, valve 347, and valve 352 are closed, such that coolant flow first goes through first fuel cell stack 320, and then the coolant flow splits, with a portion of the coolant flow going through first radiator device 340 to be cooled and with another portion of the coolant flow going through second fuel cell stack 325 to provide heat thereto. Different embodiments of a heat transference mode are envisioned, for example, with second fuel cell stack 325 supplying heat to first fuel cell stack 320, with second fuel cell stack 325 supplying heat to energy storage device 330, or with energy storage device 330 providing heat to the fuel cell stacks. In one embodiment, energy storage device 330 can be a renewable energy storage device connected to an exemplary solar cell or wind turbine, such that energy storage device 330 has a replenishing source of heat to distribute to the rest of the system. FIG. 7B illustrates an exemplary renewable energy source unit capable of providing power to a renewable energy storage device. Renewable energy source unit 390 is illustrated including both a solar panel 392 and a wind turbine unit 394 and in power providing connection to energy storage device 330. Renewable energy source unit 390 is an example of a device useful to supply power to a renewable energy storage device such as energy storage device 330. Alternatively, the embodiment of FIG. 7A can be operated in an anti-freeze mode, with first fuel cell stack 320 providing heat to maintain components of the system, for example, second fuel cell stack 325 at a temperature above a freezing condition.

Figure 8:
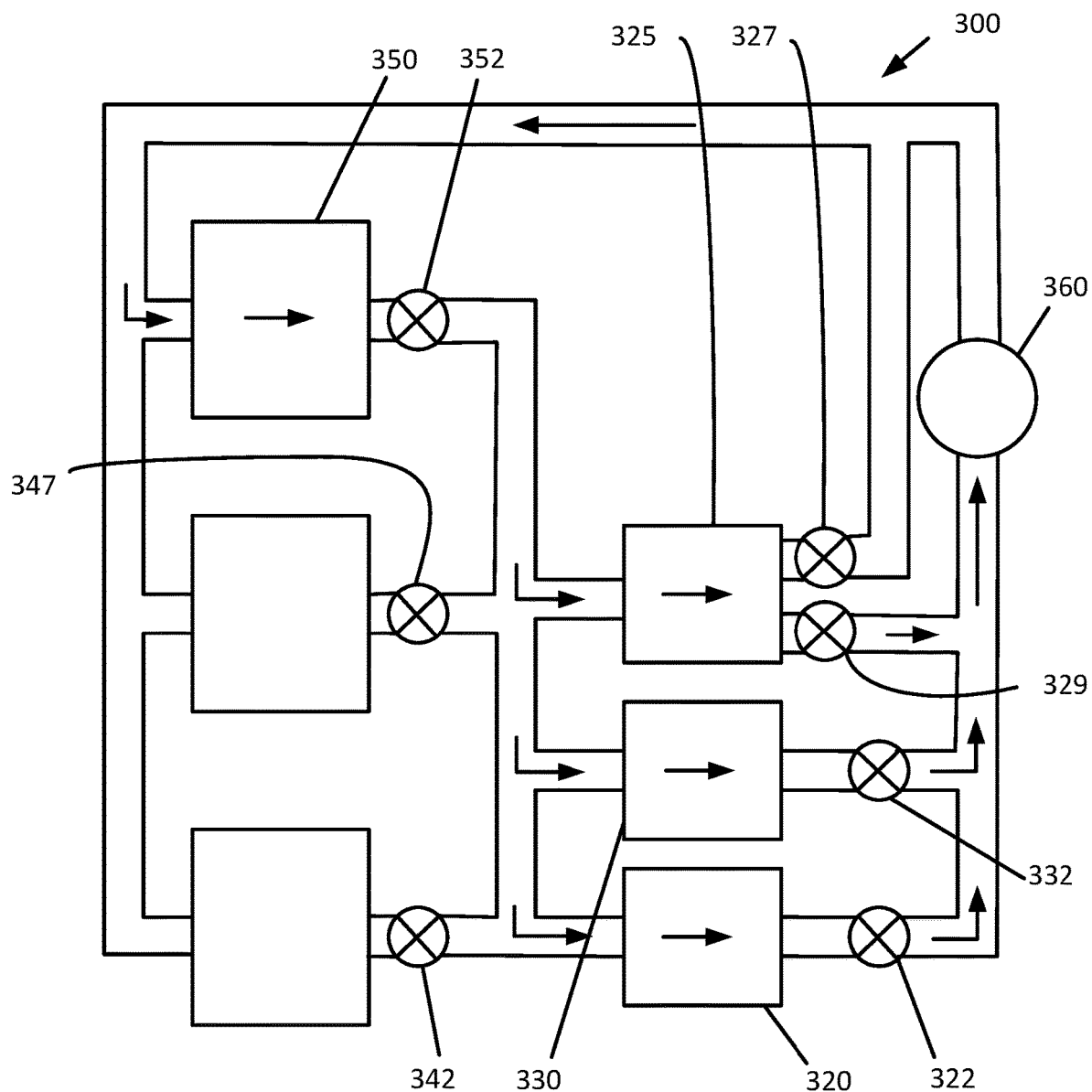
FIG. 8 illustrates the system of FIG. 7A, wherein the system is in an anti-freeze mode, in accordance with the present disclosure.

FIG. 8 illustrates the system of FIG. 7A, wherein the system is in an anti-freeze mode. Fuel cell stack thermal management system 300 is illustrated including first fuel cell stack 320, second fuel cell stack 325, energy storage device 330, water pump 360, and heat reservoir 350. Valve 322, valve 332, valve 329, and valve 352 are illustrated in open states, while valve 327, valve 342, and valve 347 are illustrated in closed states. As a result, a heated coolant flow is generated from stored heat within heat reservoir 350, and the heated coolant flow can be channeled through first fuel cell stack 320, second fuel cell stack 325, and/or energy storage device 330. Flow through first fuel cell stack 320, second fuel cell stack 325, or energy storage device 330 can be controlled by opening or closing valve 322, valve 329, or valve 332, respectively. Exemplary flow within fuel cell stack thermal management system 300 is illustrated reversed from a flow direction illustrated in FIG. 1, representing utilizing a shortest flow path from heat reservoir 350 to first fuel cell stack 320, second fuel cell stack 325, and energy storage device 330 possible, in an exemplary effort to reduce heat loss from the heated coolant in exemplary hoses between heat reservoir 350 and the devices to be heated.

Figure 9:
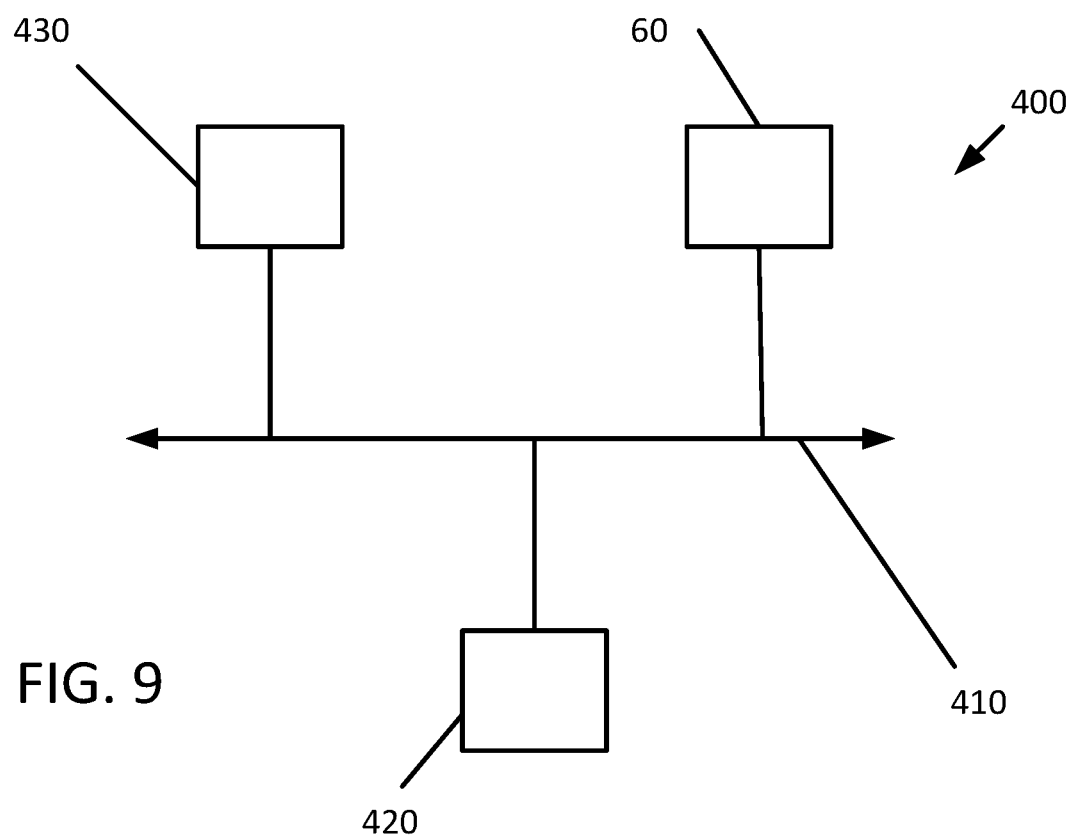
FIG. 9 illustrates an exemplary embodiment of a fuel cell stack thermal management control module communicating with other components of the fuel cell stack thermal management system through a communications bus, in accordance with the present disclosure.

FIG. 9 illustrates an exemplary embodiment of a fuel cell stack thermal management control module communicating with other components of the fuel cell stack thermal management system through a communications bus. Fuel cell data communication and control architecture 400 is illustrated. Fuel cell stack thermal management control module 420 is illustrated, including programming to control aspects of the system useful to accomplish the various thermal control modes described herein. Fuel cell stack thermal management control module 420 is illustrated in electronic communication with other exemplary components of a fuel cell stack thermal management control system, namely, a fuel cell stack control module 430 and water pump 60, through communications bus 410.

Figure 10:
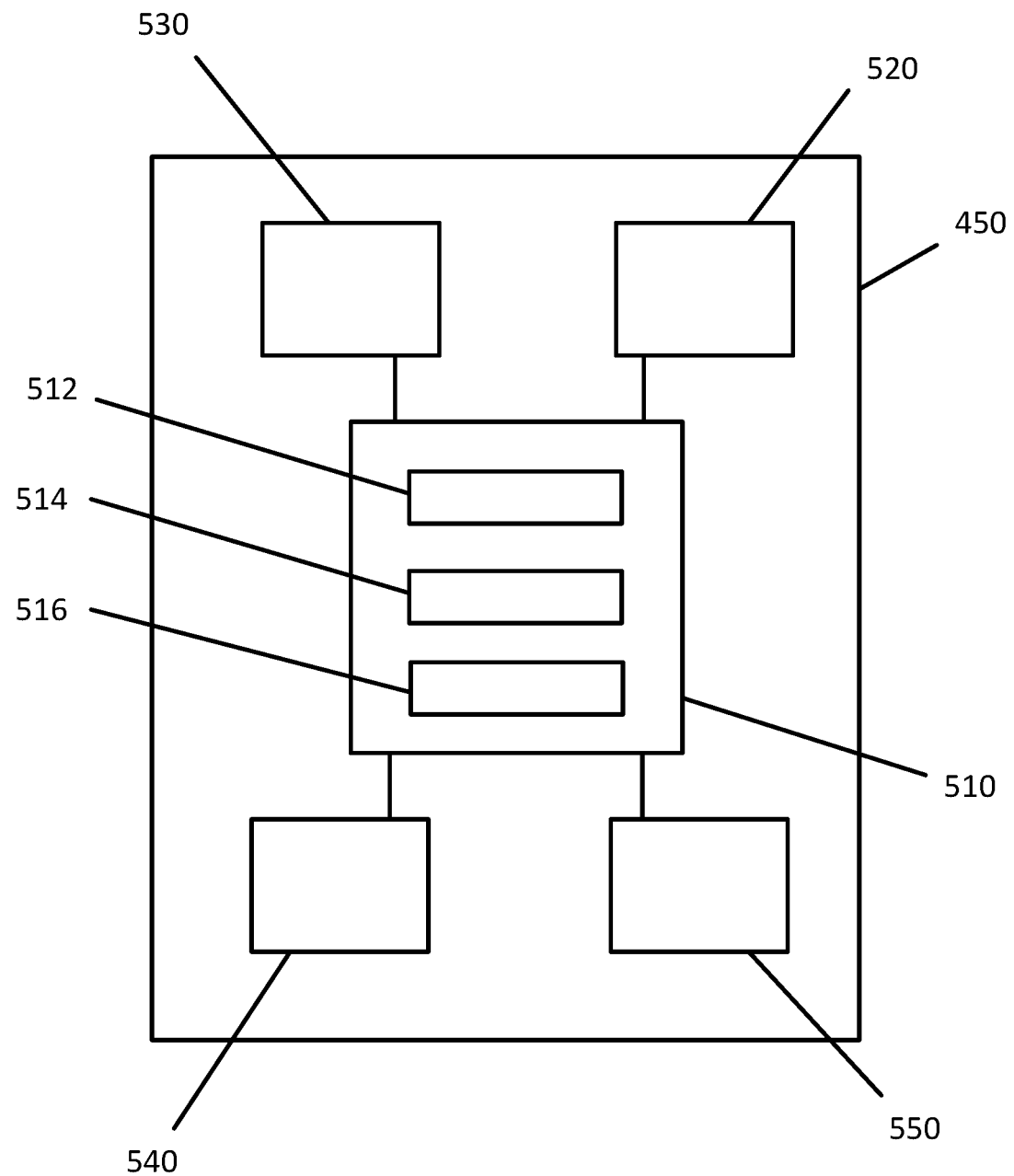
FIG. 10 illustrates an exemplary fuel cell stack thermal management control module including a computerized processor operating the disclosed fuel cell stack thermal management system, in accordance with the present disclosure.

FIG. 10 illustrates an exemplary fuel cell stack thermal management control module including a computerized processor operating the disclosed fuel cell stack thermal management system. Fuel cell stack thermal management control module 420 may include processing device 510 configured to operate computerized programming. In the illustrative embodiment illustrating optional features of the disclosed system, fuel cell stack thermal management control module 420 includes processing device 510, a user interface 530, a communications device 520, a memory device 550, a global positioning system (GPS) 540. It is noted that fuel cell stack thermal management control module 420 can include other components and some of the components are not required in some embodiments.

The processing device 510 can include memory, e.g., read only memory (ROM) and random-access memory (RAM), storing processor-executable instructions and one or more processors that execute the processor-executable instructions. In embodiments where the processing device 510 includes two or more processors, the processors can operate in a parallel or distributed manner. Processing device 510 can execute the operating system of the fuel cell stack thermal management control module 420. Processing device 510 can include one or more modules executing programmed code or computerized processes or methods including executable steps. Illustrated modules can include a single physical device or functionality spanning multiple physical devices. In the illustrative embodiment, the processing device 510 also executes thermal mode selection module 512, valve control module 514, and fuel cell controller interface module 516, which are described in greater detail below.

The user interface 530 is a device that allows a user to interact with the fuel cell stack thermal management control module 420. While one user interface 530 is shown, the term "user interface" can include, but is not limited to, a touch screen, a physical keyboard, a mouse, a microphone, a speaker, and other user interface devices in the art.

The communications device 520 can include a communications/data connection with a vehicle bus device configured to transfer data to different components of the system and can include one or more wireless transceivers for performing wireless communication.

The memory device 550 is a device that stores data generated or received by the fuel cell stack thermal management control module 420. The memory device 550 may include, but is not limited to, a hard disc drive, an optical disc drive, and/or a flash memory drive.

The GPS 540 determines a location of the fuel cell stack thermal management control module 420 by communicating with a plurality of GPS satellites. The GPS 540 can perform triangulation techniques to determine the GPS coordinates of the fuel cell stack thermal management control module 420. It should be appreciated that while a GPS 540 is shown, other suitable component or device useful in the art for determining a location of the system such as by cell phone tower signal triangulation can be implemented.

According to one exemplary embodiment of the disclosure, methods and processes of the disclosed system can be executed by a remote server device in communication with the fuel cell stack thermal management control module 420 and other resources over a communications network, such as the Internet. Thermal mode selection module 512 can receive information either through connection to local sensors or through the wireless communication regarding current ambient conditions such as current weather conditions and estimate sun load. Local sensors can additionally provide information such as current coolant temperatures, current device temperatures, current operative states of the various components of the system, valve positions, coolant flow, energy storage device SOC, hydrogen fuel storage levels, and other relevant current information. Wireless communication can be used to acquire data such as weather forecasts, time of day, estimated fuel cell usage in coming time periods, estimated fuel deliveries, and other relevant current and predictive information. Utilizing these inputs, Thermal mode selection module 512 utilizes programmed logic in accordance with the present disclosure to set a thermal control mode for the system.

Valve control module 514 may receive information or commands from throughout the system, for example, from thermal mode selection module 512 regarding a current thermal control mode being operated, and valve control module 514 may include programming to control various electrically activated solenoids and/or vacuum controlled valves to execute valve control in accordance with the present disclosure.

Fuel cell controller interface module 516 may coordinate information with a fuel cell control module within the system and may utilize this information to, for example, determine or estimate current or predicted thermal conditions in devices throughout the system and provide that information to the thermal mode selection module 512.

Fuel cell stack thermal management control module 420 is provided as an exemplary computerized device capable of executing programmed code to operate the disclosed fuel cell stack thermal management system. A number of different embodiments of fuel cell stack thermal management control module 420, devices attached thereto, and modules operable therein are envisioned, and the disclosure is not intended to be limited to examples provided herein.

Figure 11:
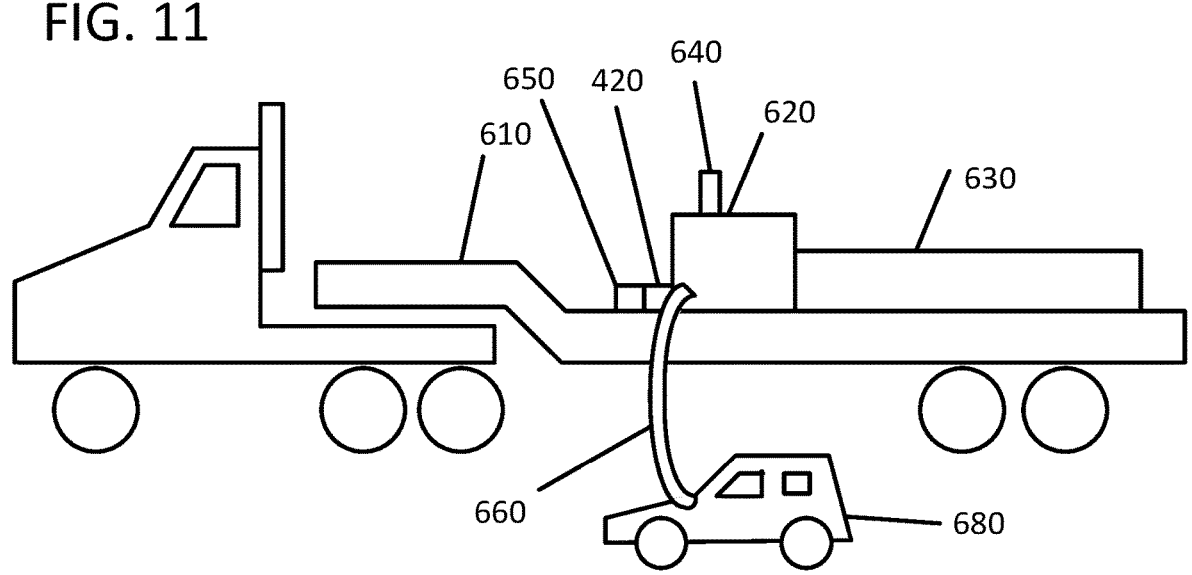
FIG. 11 illustrates an exemplary mobile charger embodied as a trailer device providing a charge to an exemplary electric vehicle, in accordance with the present disclosure.
Figure 12:
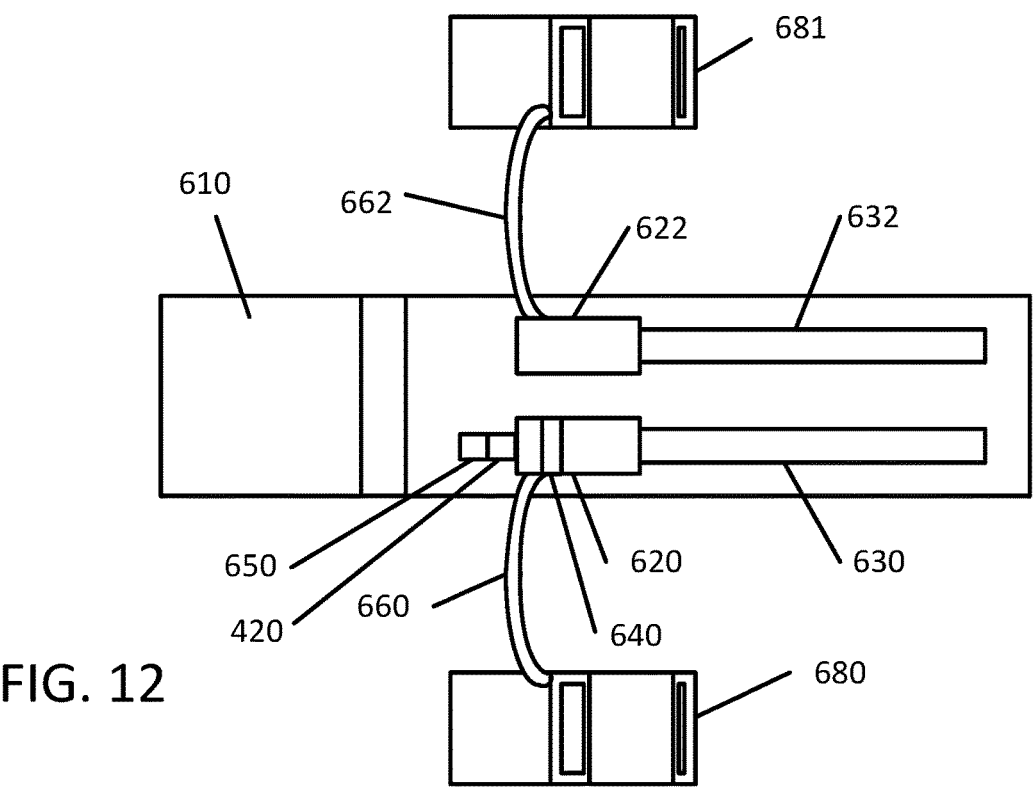
FIG. 12 illustrates the mobile charger of FIG. 11 from a top view, in accordance with the present disclosure.

FIG. 11 illustrates an exemplary mobile charger embodied as a trailer device providing a charge to an exemplary electric vehicle. Mobile charger 610 is illustrated, including hydrogen tank 630, fuel cell 620, charging tether 660, fuel cell stack thermal management control module 420, radiator device 640, and heat reservoir 650. Charging tether 660 is illustrated connected to electric vehicle 680. FIG. 12 illustrates the mobile charger of FIG. 11 from a top view. Exemplary mobile charger 610 includes two separate hydrogen tanks 630 and 632, to separate fuel cells 620 and 622, and two separate charging tethers 660 and 662. Electric vehicle 680 and a second electric vehicle 681 are simultaneously being charged. Some fuel cell chargers utilize an energy storage device to receive charge from a fuel cell or fuel cells and then provide power to an attached electric vehicle from the energy storage device. The embodiment of FIGS. 11 and 12 directly couple fuel cells to electric vehicles, as one exemplary embodiment of a charger. In accordance with operation of the disclosed fuel cell stack thermal management system, fuel cell stack thermal management control module 420 is configured to provide thermal management of fuel cell 620 and fuel cell 622, including utilization of radiator device 640 and heat reservoir 650, as described herein.

Figure 13:
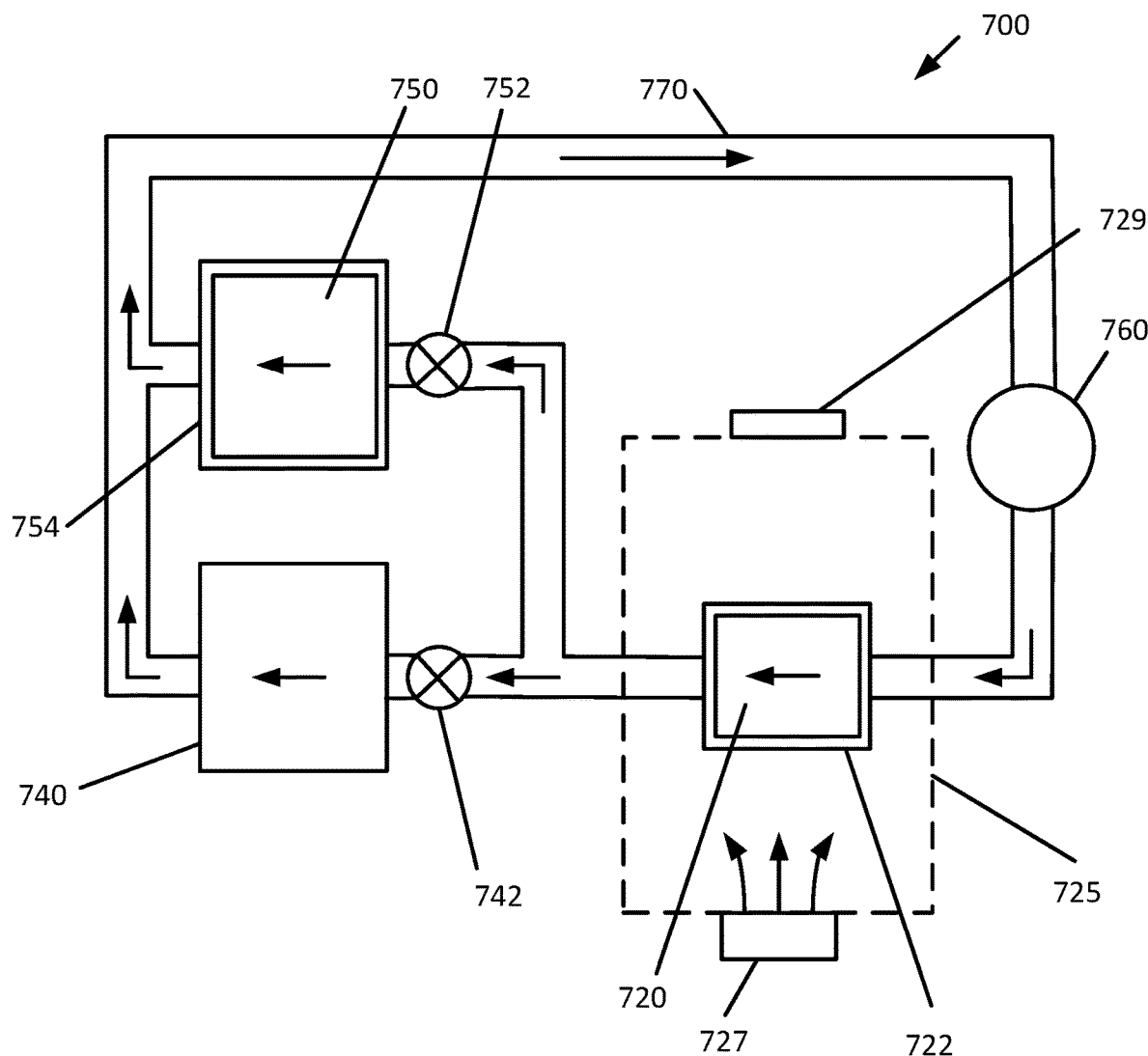
FIG. 13 illustrates an exemplary fuel cell stack thermal management system including a fuel cell stack, a coolant loop configured to maintain temperature within the fuel cell stack, a heat reservoir configured to selectively store heat, and a trace hydrogen purging system, wherein the fuel cell stack and the heat reservoir each include a thermal insulator and the system is in a maximum heat expelling mode, in accordance with the present disclosure.

FIG. 13 illustrates an exemplary fuel cell stack thermal management system including a fuel cell stack, a coolant loop configured to maintain temperature within the fuel cell stack, a heat reservoir configured to selectively store heat, and a trace hydrogen purging system, wherein the fuel cell stack and the heat reservoir each include a thermal insulator and the system is in a maximum heat expelling mode. Fuel cell stack thermal management system 700 is illustrated, including fuel cell stack 720, radiator device 740, water pump 760, and heat reservoir 750. Various pipes or coolant hoses are illustrated as coolant loop 770 configured to route coolant to and away from the various components of fuel cell stack thermal management system 700. Thermal insulator 722 is illustrated attached to and surrounding fuel cell stack 720, and thermal insulator 754 is illustrated attached to and surrounding heat reservoir 750. Thermal insulator 722 is configured to maintain heat within fuel cell stack 720, for example, preventing fuel cell stack 720 from rapidly cooling after fuel cell stack 720 is transitioned into an off state. Thermal insulator 754 is configured to maintain heat within or prevent heat from unintentionally entering heat reservoir 750. In various thermal management states, as described herein, the system may require either a flow of heated coolant or a flow of unheated coolant from heat reservoir 750. Thermal insulator 754 increases a duration at which heat reservoir 750 can keep an amount of coolant within heat reservoir 750 within a temperature range. Valve 742 and valve 752 are both illustrated in open states, such that coolant flow is provided through both radiator device 740 and heat reservoir 750. In such a maximum heat expelling state, both radiator device 740 and heat reservoir 750 can be used to remove heat from fuel cell stack 720, in accordance with the present disclosure.

Fuel cell stack 720 is illustrated contained within or encapsulated by fuel cell housing 725, represented by dotted lines. Fuel cell ventilation fan 727 is illustrated located attached to and providing an air flow into fuel cell housing 725. Fuel cell ventilation fan is configured to purge fuel cell housing of trace hydrogen gas. An air extractor 729 is illustrated attached to fuel cell housing 725 configured to permit air to exit fuel cell housing 725 as air is introduced into fuel cell housing 725 by fuel cell ventilation fan 727. In one embodiment, fuel cell ventilation fan 727 can be positioned at a bottom of fuel cell housing 725, and air extractor 729 can be positioned at a top of fuel cell housing 725. Hydrogen gas naturally rises in air, and by positioning fuel cell ventilation fan 727 at a bottom of fuel cell housing 725 and by positioning air extractor 729 at a top of fuel cell housing 725, hydrogen can be efficiently purged. One could reverse a flow of the fan, position the fan at a top of fuel cell housing 725, and position an air intake register at a bottom of fuel cell housing 725 to achieve a similar result.

The complete system minus radiator could be encapsulated by the housing 725 to further insulate/isolate from the environment. A purge system may be utilized on the housing as shown or further improved using a heat exchanger on the enclosure with one side evacuating air within the enclosure using a fan with the other side of the heat exchanger allowing natural flow into the enclosure. The result would be any heat exiting the enclosure would heat the inlet air to the enclosure.

Heat reservoirs as disclosed herein can be passive, meaning that heat is transferred from hot coolant to the reservoir and that that heat is later transferred back to the coolant for later use. Heat reservoirs can alternatively or additionally be actively heated, for example, by a heat pump bringing heat from some other source or by active fueled heating.

While the best modes for carrying out the disclosure have been described in detail, those familiar with the art to which this disclosure relates will recognize various alternative designs and embodiments for practicing the disclosure within the scope of the appended claims.

What is claimed is:

1. A system for managing heat in a mobile charger configured to provide power to an electric vehicle, the system comprising:
the mobile charger, comprising:
a fuel cell stack;
a heat reservoir including an internal volume configured for storing heated coolant within the internal volume for a purpose of later using the heated coolant to provide heat to the fuel cell stack;
a liquid coolant system comprising one or more liquid coolant loops configured to transfer heat between the fuel cell stack and the heat reservoir; and
a computerized processor, programmed to selectively control the liquid coolant system in one of a plurality of thermal management modes configured to selectively remove heat from the fuel cell stack and provide heat to the fuel cell stack.

2. The system of claim 1, wherein the computerized processor programmed to selectively control the liquid coolant system in one of the plurality of thermal management modes comprises the computerized processor programmed to selectively control the liquid coolant system in one of:
a heat capture mode configured to provide heat to the heat reservoir from the fuel cell stack; and
a heat providing mode configured to provide heat from the heat reservoir to the fuel cell stack.

3. The system of claim 2, wherein the computerized processor programmed to control the liquid coolant system in the heat providing mode comprises the computerized processor programmed to control the liquid coolant system in one of:
an antifreeze mode configured to prevent the fuel cell stack from reaching a freezing condition; and
a pre-warm mode configured to bring the fuel cell stack to a minimum temperature of a design temperature range for the fuel cell stack.

4. The system of claim 2, wherein the mobile charger further comprises a radiator device configured to expel heat.

5. The system of claim 4, wherein the computerized processor programmed to control the liquid coolant system in the heat providing mode comprises the computerized processor programmed to control the liquid coolant system in one of:
a heat expelling mode wherein heat is expelled through the radiator device; and
a maximum heat expelling mode wherein heat is expelled through the radiator device and heat is provided from the fuel cell stack to the heat reservoir.

6. The system of claim 1, wherein the mobile charger further comprises an energy storage device; and
wherein the liquid coolant system configured to transfer heat between the fuel cell stack, the energy storage device, and the heat reservoir.

7. The system of claim 6, wherein the energy storage device comprises a renewable energy storage device.

8. The system of claim 1, wherein the fuel cell stack comprises a first fuel cell stack;
wherein the mobile charger further comprises a second fuel cell stack; and
wherein the liquid coolant system is configured to transfer heat between the first fuel cell stack, the second fuel cell stack, and the heat reservoir; and
wherein the computerized processor programmed to selectively control the liquid coolant system in one of a plurality of thermal management modes comprises the computerized processor being programmed to selectively control the liquid coolant system in one of:
a heat capture mode configured to provide heat to the heat reservoir from the first fuel cell stack and the second fuel cell stack;
a heat providing mode configured to provide heat from the heat reservoir to the first fuel cell stack and the second fuel cell stack; and
a heat transference mode configured to provide heat from the first fuel cell stack to the second fuel cell stack.

9. The system of claim 1, wherein the mobile charger further comprises a fuel cell housing containing the fuel cell stack; and
a fuel cell ventilation fan configured to purge fuel cell housing of trace hydrogen gas.

10. The system of claim 1, further comprising a thermal insulator attached to the fuel cell stack.

11. The system of claim 1, further comprising a thermal insulator attached to the heat reservoir.

12. The system of claim 1, wherein the mobile charger further includes a first radiator device and a second radiator device; and
wherein the liquid coolant system is configured to transfer heat between the fuel cell stack, the first radiator device, the second radiator device, and the heat reservoir.

13. The system of claim 12, wherein the computerized processor programmed to selectively control the liquid coolant system in one of the plurality of thermal management modes comprises the computerized processor programmed to selectively control the liquid coolant system to:
expel heat from the first radiator device and the second radiator device;
provide heat from the fuel cell stack to the heat reservoir;
expel heat from the first radiator device and provide heat to the heat reservoir; and
provide heat to the fuel cell stack from the heat reservoir.

14. A system for managing heat in a mobile charger configured to provide power to an electric vehicle, the system comprising:
the mobile charger, comprising:
a first fuel cell stack;
a second fuel cell stack;
an energy storage device;
a heat reservoir including an internal volume configured for storing heated coolant within the internal volume for a purpose of later using the heated coolant to provide heat to the first fuel cell stack and the second fuel cell stack;
a radiator device;
a liquid coolant system comprising one or more liquid coolant loops configured to transfer heat between the first fuel cell stack, the second fuel cell stack, the energy storage device, the heat reservoir, and the radiator device; and
a computerized processor, programmed to selectively control the liquid coolant system in one of a plurality of thermal management modes configured to selectively transfer heat between the first fuel cell stack, the second fuel cell stack, the energy storage device, and the heat reservoir.

15. The system of claim 14, wherein the computerized processor programmed to selectively control the liquid coolant system in one of a plurality of thermal management modes comprises the computerized processor programmed to selectively control the liquid coolant system in one of:
   a heat capture mode configured to provide heat to the heat reservoir from one of the first fuel cell stack, the second fuel cell stack, and the energy storage device;
   a heat providing mode configured to provide heat from the heat reservoir to one of the first fuel cell stack, the second fuel cell stack, and the energy storage device;
   a heat expelling mode configured to expel heat from the radiator device;
   a maximum heat expelling mode configured to expel heat from the radiator device and to provide heat to the heat reservoir from one of the first fuel cell stack, the second fuel cell stack, and the energy storage device;
   a first heat transference mode configured to provide heat from the first fuel cell stack to the second fuel cell stack;
   a second heat transference mode configured to provide heat from the first fuel cell stack to the energy storage device; and
   a third heat transference mode configured to provide heat from the energy storage device to first fuel cell stack.

16. A method for managing heat in a mobile charger configured to provide power to an electric vehicle, the method comprising:
   selectively transferring heat from a fuel cell stack of the mobile charger to a heat reservoir of the mobile charger through a liquid coolant system configured to provide thermal management of the fuel cell stack of the mobile charger and the heat reservoir of the mobile charger, wherein the heat reservoir includes an internal volume configured for storing heated coolant within the internal volume for a purpose of later using the heated coolant to provide heat to the fuel cell stack; and
   selectively transferring heat to the fuel cell stack of the mobile charger from the heat reservoir of the mobile charger through the liquid coolant system.

17. The method of claim 16, further comprising:
   selectively transferring heat from the fuel cell stack of the mobile charger to a radiator device of the mobile charger through the liquid coolant system.

18. The method of claim 17, further comprising:
   selectively simultaneously transferring heat from the fuel cell stack of the mobile charger to the radiator device of the mobile charger through the liquid coolant system and transferring heat from the fuel cell stack of the mobile charger to the heat reservoir of the mobile charger through the liquid coolant system.

19. The method of claim 16, further comprising:
   selectively transferring heat from a plurality of fuel cell stacks of the mobile charger to the heat reservoir of the mobile charger through the liquid coolant system; and
   selectively transferring heat to the plurality of fuel cell stacks of the mobile charger from the heat reservoir of the mobile charger through the liquid coolant system.

20. The method of claim 16, further comprising:
   utilizing a fuel cell ventilating fan to purge trace hydrogen gas from a fuel cell housing containing the fuel cell stack.

* * * * *